May 29, 1928. 1,671,456
R. S. THOMPSON
WIRE TYING DEVICE
Filed March 13, 1924  2 Sheets-Sheet 1

INVENTOR.
R. S. Thompson
BY Robb Robb & Hill
ATTORNEYS

May 29, 1928.
R. S. THOMPSON
WIRE TYING DEVICE
Filed March 13, 1924    2 Sheets-Sheet 2
1,671,456
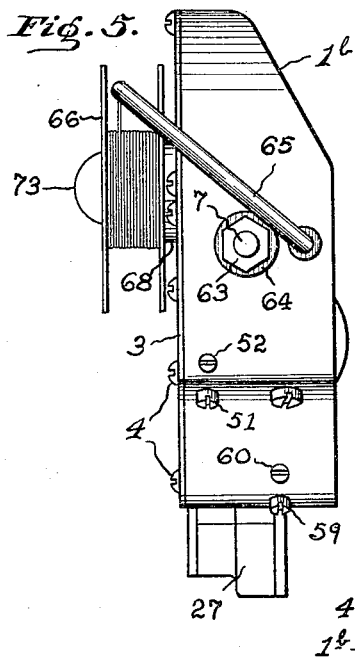
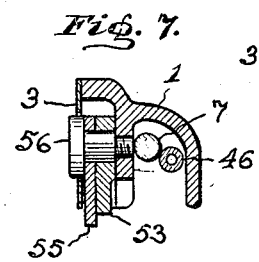
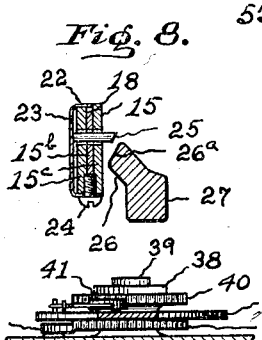
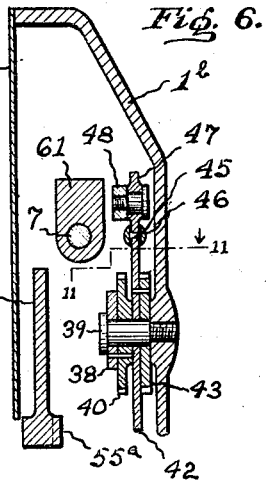
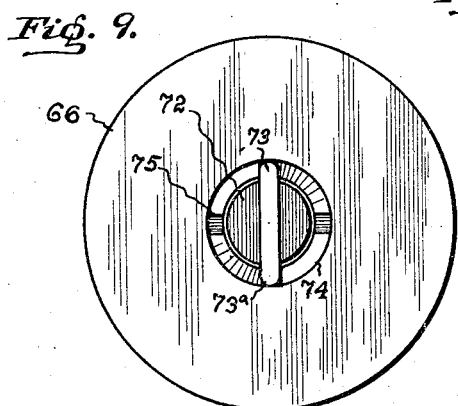
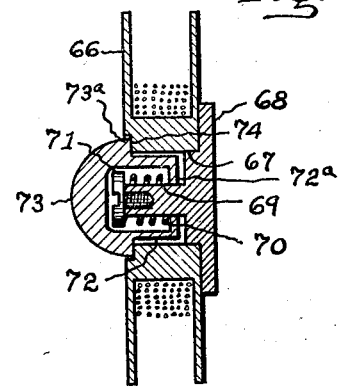
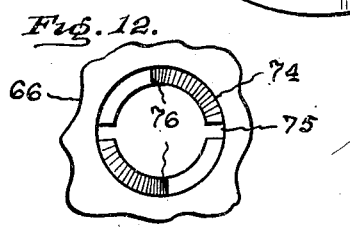
INVENTOR.
R. S. Thompson
BY Robb Robb Hill
ATTORNEYS Patented May 29, 1928.

1,671,456

UNITED STATES PATENT OFFICE.

ROY S. THOMPSON, OF BAY VILLAGE, OHIO.

WIRE-TYING DEVICE.

Application filed March 13, 1924. Serial No. 698,835.

The present invention relates to a tool for twisting lengths of wire around one or more objects, and among the objects of the invention are to provide a tool of this character which embodies novel features of construction, whereby a suitable length of wire is fed forward, severed from the main length of wire, guided around the object or objects to be secured, and the ends of the wire twisted together all in one operation.

A further object of the invention is to provide a tool of this character which is light in weight and has a compact arrangement of the parts so that it can be used as a portable hand operated tool, being adapted to be easily carried around and used for field work.

While the tool is admirably adapted for use in vineyards to fasten the vines to the heavy wires or other similar supports which are used for supporting the vines, it can be used in connection with any kind of work where it is desired to employ a portable hand tool for twisting short lengths of tie wire around objects which it is desired to tie or fasten by means of the wires.

With the above and other objects in view the invention consists in certain combinations and arrangements of the parts as will appear more fully as the description proceeds, the novel features thereof being pointed out in the appended claims.

For a full understanding of the invention reference is to be had to the following description and accompanying drawings, in which, Figure 1 is a top plan view of a wire tying tool which is constructed in accordance with the invention.

Figure 5 is a view looking at the tool from the rear end thereof.

Figure 6 is a transverse sectional view on the line 6—6 of Fig. 2.

Figure 7 is a similar view on the line 7—7 of Fig. 2.

Figure 8 is a similar view on the line 8—8 of Fig. 2.

Figure 9 is an enlarged side elevation of the spool from which the supply of wire is drawn as it is fed through the tool.

Figure 10 is a sectional view through the spool.

Figure 11 is a sectional view on the line 11—11 of Figure 6, showing the arrangement of the pawl and ratchet mechanisms which permit the intermittent forward movement of the wire feeding wheel and prevent backward rotation thereof.

Figure 12 is a plan view of the central portion of the wire spool, showing the arrangement of the notches and shoulders which cooperate with the finger piece of the retaining member for holding the spool removably in position.

Corresponding and like parts are referred to in the following description and indicated on all of the views of the drawings by like reference characters.

Figure 1:
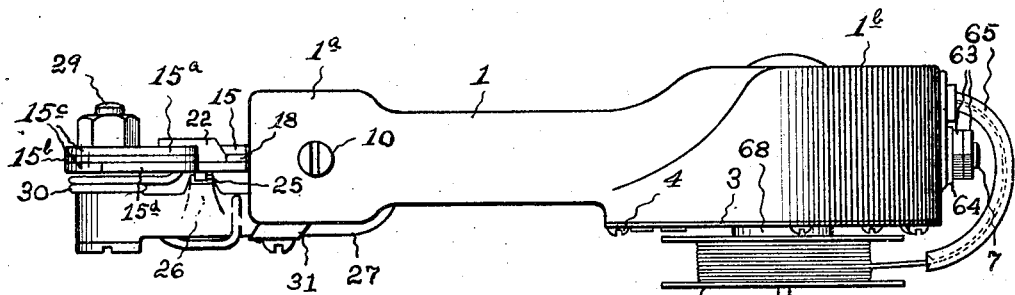

Referring to the drawings, which illustrate one of many possible embodiments of the invention, the numeral 1 designates a stock which is of an elongated formation and has a reduced central portion of a suitable size to be grasped in the hand. The forward end of the stock is enlarged as indicated at $1^a$ and has a recess 2 in the end thereof. The rear end of the stock is enlarged and provides a hollow casing $1^b$ within which certain of the operating parts of the mechanism are housed. The hollow casing $1^b$ has an open side which is normally closed by a cover plate 3, said cover plate being removably secured in position by suitable fastening means, such as the screws 4.

A rotary twisting disc 5 is arranged within the recess 2 in the forward end of the stock (see Figures 2 and 3) and the twisting disc is formed with a hub 6 which is fitted upon a twisting shaft 7, said shaft extending longitudinally through the stock and being journaled therein. The hub 6 of the twisting disc has a depression therein which is engaged by a detent 8 when the disc is in proper position for permitting the feeding and twisting of a length of wire. A spring 9 holds the detent yieldably in engagement with the hub of the twisting disc and the upper end of the spring engages a plug 10 which is threaded in the detent receiving opening of the stock. A coil spring 11 surrounds an intermediate portion of the twisting shaft 7 and has one end thereof connected to the twisting shaft while the other end is connected to the stock, said spring being arranged to be placed under tension during the wire twisting operation, so that it will assist in returning the shaft to its original position after the wire has been twisted and the handle of the tool released.

The forward end of the twisting shaft 7 is provided with a finger 12 which is received within a peripheral recess 13 of the twisting disk. One of the side walls of the recess 13 is radially disposed and is adapted to cooperate with a similarly arranged side of the finger 12 to grip the end of a wire. A lip 14 projects from the outer edge of the said radial wall of the recess 13 and the edge of the finger 12 is correspondingly recessed at 14$^a$ and this facilitates the firm gripping of the end of the wire during the twisting operation. The twisting disc 5 is loose upon the end of the twisting shaft and the initial rotary movement of the twisting shaft moves the finger 12 toward the radial wall of the recess 13 of the twisting disc, whereupon the end of a length of wire which has been caused to project into the recess is gripped. Further rotation of the twisting shaft results in a rotation of the twisting disc with the shaft, the spring detent 8 being disengaged from the notch or depression in the hub of the twisting disc. After the completion of the operation the twisting shaft is rotated back to its original position and the finger 12 then engages the opposite end wall of the recess 13 so that the twisting disc is also brought back to its original position. At the completion of the return movement of the twisting disc the detent 8 again engages the notch or depression in the hub of the twisting disc.

The forward end of the stock 1 is provided with a head 15 and in the present instance the head has a hooked formation and is detachably secured to a flanged portion of the stock 1 by suitable fastening means such as the screws 16. The hooked portion 15$^a$ of the head is arranged opposite to the end of the stock 1 and cooperates therewith to provide a space or notch to receive the object or objects such as the vine and supporting wire around which the tie wire is to be twisted. The head 15 is shown as formed of superposed thicknesses of material which are fastened together by means of the screws 17. The intermediate thickness 15$^b$ has a side plate or thickness 15$^c$ on each side thereof, and the intermediate thickness has a thickness slightly greater than the diameter of the wire which is to be operated upon.

A guide groove 18 extends around the inner side of the hooked portion 15$^a$ of the head and this guide groove is conveniently formed by cutting away edge portions of the intermediate thickness or plate 15$^b$ of the head. At the base of the head the end of the guide groove 18 is in alignment with a wire receiving passage 19 extending longitudinally through the forward end 1$^a$ of the head. The twisting disc 5 has a wire guiding sleeve 20 fitted therein which registers with the passage 19 while the wire is being fed forward to the twisting elements of the tool. A die plate 21 is applied to the stock 1 at the end of the passage 19 and the plate has an opening therein through which the wire passes. The die plate 21 and sleeve 20 may be formed of hardened metal and have sharp edges so that they will cooperate with each other to cut the wire when the disc is rotated.

A retaining plate 22 extends over the guide groove 18 at the inner end of the hooked jaw portion of the head 15, and this retaining plate is carried by a spring arm 23, (see Fig. 8) which extends along one side of the head. The opposite end of the spring arm is bent around the outer edge of the head and suitably secured thereto by means of a screw 24. This retaining plate 22 normally projects over the guide groove 18 so that the wire is retained within the groove and prevented from working its way out of the groove or becoming disengaged therefrom during the feeding movement of the wire. The spring arm 23 which carries the retaining plate is provided with a pin or plunger 25 which projects loosely through an opening in the head 15. The end of this pin or plunger projects into the path of a cam face 26$^a$ on an arm 26 on the operating lever 27. After the wire has been fed and initially guided around the vine and its support, the cam face 26$^a$ engages the beveled end of the pin or plunger 25 and forces the plunger inwardly, thereby flexing the spring arm 23 and moving the retaining plate 22 away from the guide groove. This prevents the retaining plate 22 from interfering with the twisting of the wire and enables the tool to be readily removed from the twisted tie wire and the vine after the twisting operation has been completed.

Figure 4:
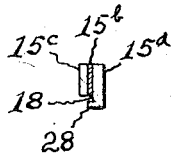
Figure 4 is a similar view on the line 4—4 of Fig. 2.

At the end portion of the hooked body the guide groove 18 opens through a side of the body or head, as indicated by Fig. 4. This facilitates the subsequent disengagement of the wire from the guide groove 18, although the wire is effectively retained within the guide groove during the feeding operation.

Figure 2:
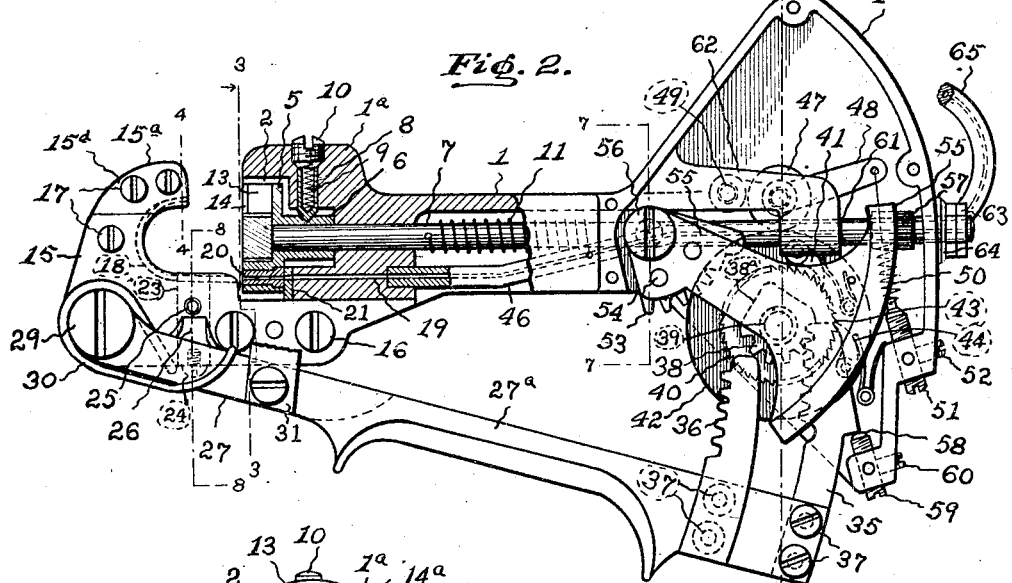
Figure 2 is a side elevation thereof with the side cover plate removed and with parts broken away and shown in section.

The laterally opening end portion of the guide groove as shown by Figures 2 and 4 is readily provided by forming a lip 28 on a small section 15$^d$ of one of the side plates 15$^c$.

The operating lever 27 is pivotally mounted at its forward end upon the head 15 of the tool, being attached thereto by means of the pivot bolt 29. A spring 30 which is coiled around the pivot bolt has one end thereof in engagement with the head and the other end thereof in engagement with the lever so that the lever is automatically returned to its original position after the twisting operation has been completed and pressure thereon is released. At a point toward the pivot end thereof the operating lever is provided with a resilient arm 31, having a plate 32 at its upper end which is arranged at one side of the twisting disc 5. A strip 33 is rigid with the arm 31 and arranged at the inner face of the plate so that it forms a nose for engagement with a shoulder 34 on the periphery of the twisting disc. Upon the initial upward movement of the operating handle the required length of wire is fed forward and the nose 33 then engages the shoulder 34, so that the necessary force will be applied directly to the twisting disc for cutting the wire at the beginning of the rotation thereof. The force for the initial movement of the twisting disc which results in cutting the wire is thus applied directly to the periphery of the disc so that there is a direct application of power for this purpose.

The middle portion 27ª of the lever is suitably formed or shaped to be gripped by the hand, and the rear end of the operating lever is provided with a pair of upwardly projecting rack arms 35 and 36, respectively. These rack arms are secured by suitable fastening members such as the screws 37 to enlarged portions projecting laterally from opposite sides of the operating lever so that the racks are offset laterally from each other. The rack 35 engages the teeth of a pinion member 38 which is loosely mounted upon a stub shaft 39. The pinion member is rigid with a ratchet wheel 40 which is engaged by a spring actuated pawl 41 on a feed wheel 42. A second ratchet wheel 43 with the teeth thereof facing in an opposite direction from the teeth of the ratchet wheel 40 is rigidly connected to the feed wheel 42 and this ratchet wheel 43 is engaged by a spring pressed pawl 44 mounted upon the walls of the casing 1ᵇ. This pawl 44 cooperates with the teeth of the ratchet wheel 43 to prevent backward rotation of the feed wheel 42.

A portion of the periphery of the feed wheel 42 projects into a slot 45 formed in a wire guiding tube 46, said tube extending longitudinally through the stock 1 and having the forward end thereof fitted in a recessed portion of the end 1ª of the stock with the opening of the tube in communication with the rear end of the before mentioned wire receiving passage 19. A pressure wheel 47 cooperates with the feed wheel 42 to grip the wire and feed it forward through the tube at the proper time. This pressure wheel also projects into the slot 45 and is carried by a lever 48 which is pivotally mounted at 49 upon the interior of the casing. The free end of the lever is connected to a tension spring 50, and the tension in this spring can be adjusted by moving the screw 51 in and out. After the proper adjustment has been obtained a set screw 52 is tightened against the adjusting screw 51.

Upon the initial movement of the operating lever 27 the rack 35 thereof rotates the pinion member 38 which is rigid with the ratchet wheel 40. The pawl 41 is then engaged by the teeth of the ratchet wheel 40 so as to cause the feed wheel 42 to rotate with the ratchet wheel and pinion member, and the feed wheel and pressure wheel then cooperate with each other to force the wire forward through the wire feeding tube and feed the required length of wire to the twisting mechanism. During this forward movement of the feed wheel 42 the pawl 44 slips over the inclined faces of the teeth of the ratchet wheel 43. As soon as the required length of wire has been fed forward a flat side 38ª of the pinion member is brought into engagement with a lower straight edge portion of the rack arm 35, with the result that the pinion member is locked against further rotation during the inward movement of the operating lever.

Figure 3:
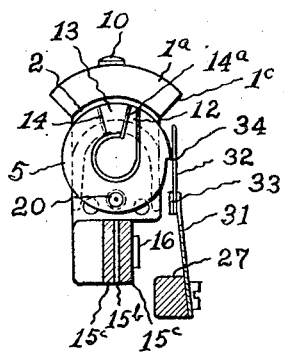
Figure 3 is a transverse sectional view on the line 3—3 of Fig. 2.

As soon as the wire feeding operation has been completed the rack arm 36 is brought into engagement with a toothed segment 53 which is secured by the pins 54 to the pivot end of a segmental rack 55. The segmental rack is pivotally mounted upon a pivot screw 56, as shown clearly by Figures 2 and 7, and the teeth 55ª of the segmental rack engage a pinion 57 on the twisting shaft 7. The movement of the segmental rack rotates the twisting shaft and twisting disc, and for ordinary purposes it has been found that it is sufficient to give the twisting shaft about one and one-half revolutions. When the operating lever 27 is released it is returned to its original position by the action of the spring 30, and the outward swinging movement of the operating lever is limited by the engagement of a shoulder 58 on the back of the rack arm 35 with the stop screw 59 which is threaded in a portion of the end wall of the hollow casing 1ᵇ. After the stop screw 59 has been properly adjusted a set screw 60 is tightened and brought into engagement therewith. Upon the backward rotation of the pinion member 38 the pawl 44 engages the teeth of the ratchet 43 to prevent backward movement of the feed wheel 42 and the pawl 41 slips over the inclined teeth of the ratchet wheel 40. Referring to Figure 3 it will be noticed that upon the initial backward rotation of the twisting disc 5 the shoulder 34 thereof would tend to engage the nose 33, although this is prevented by reason of the fact that the upper edge of the plate 32 which is carried by the resilient arm 31 engages an inclined edge portion 1ᶜ of the forward end of the stock and cooperates therewith to flex the resilient arm 31 and move the nose 33 out of the path of the shoulder 34. The plate 32 does not become disengaged from the inclined portion 1ᶜ of the stock until after it is too late for the nose 33 to interfere with the backward rotation of the twisting disc and the nose is then again brought into operative position, as indicated by Figure 3.

The rear end of the twisting shaft is journaled in a bearing 61 which is arranged within the hollow casing 1ᵇ and supported by an arm 62 projecting from the walls of the casing. The extreme rear end of the twisting shaft extends through an opening in the rear of the hollow casing and is shown as having nuts 63 threaded thereon, the outer nut serving as a jam nut. The inner nut engages a bearing surface 64 on the casing and cooperates therewith to hold the shaft against longitudinal movement.

The rear end of the wire guiding tube 46 extends through the rear end of the hollow casing 1ᵇ and communicates with a curved extension 65 which is adapted to receive the wire from a spool 66 mounted on the cover plate 3. The spool is formed with a central opening which fits over and obtains a bearing on a boss 67 formed in connection with a base plate 68 which is adapted to be suitably secured to the cover plate 3. A stem 69 projects from the boss 67 and a coil spring 70 which surrounds the stem is interposed between the head of a screw 71 applied to the end of the stem and a flange 72ᵃ at the inner end of a retaining member 72. This retaining member has a hollow formation so that it can telescope on the stem, and the body portion of the retaining member is of a suitable size to be received loosely within the central opening of the spool 66. A finger piece 73 projects rearwardly from the retaining member 72 and has end portions 73ᵃ which extend laterally beyond the periphery of the retaining member. The central opening of the spool 66 has the outer edge thereof rabbeted, as indicated at 74, and notches 75 are formed in the opening at diametrically opposite sides thereof. When the overhanging end portions 73ᵃ of the finger piece 73 are in registry with the notches 75, the spool 66 can be readily placed in position or removed therefrom. After the spool has been placed in position the retaining member 72 is drawn outwardly a slight distance and then rotated to move the portions 73ᵃ of the finger piece away from the notches 75 and bring them into engagement with the shoulders 76 which are provided at the base of the rabbeted portion 74 at points intermediate the two notches 75. These shoulders then engage the end portions 73ᵃ of the finger piece so that the finger piece and retaining member will rotate with the spool as the wire is unwound therefrom and the parts 73ᵃ will not be brought into registry with the notches 75 during the normal operation of the tool. When the wire has been exhausted from the spool the finger piece can be grasped and manipulated to bring the ends 73ᵃ thereof into engagement with the notches 75, whereupon the spool can be readily removed from the tool and a fresh spool applied thereto.

In the operation of the tool the object or objects such as the grape vine and supporting wire around which the tie wire is to be twisted are brought into position within the space between the hooked end of the head or jaw 15 and the forward end of the stock. The reduced intermediate portion of the stock and the middle portion 27ᵃ of the operating lever are grasped by the hand by which the tool is supported and brought into operative position. After being properly positioned the fingers of the hand are tightened upon the operating lever 27 and the latter forcibly swung inwardly toward the stock. Upon the initial movement of the operating lever the rack 35 rotates the pinion member 38 and feeds a suitable length of wire forward, as has been previously described. This wire passes through the wire guiding sleeve 20 of the twisting disc and enters the end of the guide groove 18. This guide groove directs the wire around the inner curved portion of the hooked jaw as it is fed forward, and the retaining plate 22 keeps the wire within the groove during this feeding movement thereof. The free end of the wire after traveling through the full length of the guide groove 18 projects from the free end of the hooked body and is thrust across the space between the jaw and the stock, the end of the wire finally entering the recess 13 of the twisting disc. This completes the wire feeding operation and at this point the nose 33 of the arm 31 engages the shoulder 34 of the twisting head so that the force is applied directly thereto for the initial movement thereof, which results in cutting the wire. The rack arm 36 then engages the toothed segment 53 and moves the segmental rack 55, as has been previously described, to rotate the twisting shaft 7. The initial movement of the twisting shaft moves the finger 12 thereof toward the radial wall of the twisting disc, and causes the end of the wire to be firmly grasped between the said elements. The twisting disc then rotates with the shaft 7, with one end of the wire grasped by the finger 12, as just described, while the other end of the wire is in engagement with the sleeve 20. It will thus be obvious that the rotation of the disc will twist the ends of the wire together, with the result that the wire will be fastened around the vine and its support. Just prior to the twisting operation the plunger 25 is engaged by the cam face of the arm 26 and the retaining plate 22 moved away from the top of the guide groove 18 at the base of the curved jaw, thereby enabling the wire to be readily disengaged from the head of the tool. Upon the release of the operating lever the parts are all restored to their original positions, as previously described, and the tool can be quickly applied to another part of the vine which it may be desired to fasten to its supporting wire by means of a tie wire.

The tool is well adapted for use in fastening grape vines to the supporting wires which are commonly used in vineyards. At the present time the wires which are used for fastening the grape vines to their supports are ordinarily twisted by hand, and this is not only a slow, laborious and rather costly proceeding, but one which is very painful and unpleasant, for the reason that the continual twisting of the wires with the fingers causes the wires to cut the fingers in a painful manner. The use of this tool will enable one man to do the work which would require several men if it were done by hand. While the tool will be found to be very useful in vineyards for use in securing the vines to their supporting wires, it will be understood that it can be used to advantage in any work where it is desired to use a portable hand operated tool for twisting tie wires around objects for any purpose.

While one particular embodiment of the invention has been shown and described with particularity for illustrative purposes, it will be understood that many modifications and changes can be made in the details of construction without departing from the spirit of the invention and the scope of the claims.

Having thus described my invention what I claim as new and desire to secure by Letters Patent is:

1. A tool of the character described including means for feeding a length of wire longitudinally, guide means for bending the wire partially around the object as it is fed forward, wire retaining means associated with the guide means, means for releasing the retaining means after the feeding of the wire, and means for severing the wire and twisting the ends thereof.

2. A tool of the character described including a hooked jaw provided with a wire receiving guide groove which opens laterally of the jaw at the end of the hooked portion thereof and internally of the jaw at other portions thereof, means for feeding wire through the groove from the base of the jaw, releasable wire retaining means associated with the grooves at the base of the jaw, means for releasing the retaining means after the feeding of the wire, means for cutting the wire, and means for twisting the ends of the severed length of wire.

3. A tool of the character described including a jaw member provided with a wire receiving groove, means for feeding wire through the groove, releasable wire retaining means associated with the groove, wire twisting means, a lever operatively connected with the wire twisting means, and means actuated by the lever for automatically releasing the wire retaining means.

4. A tool of the character described including a jaw member provided with a wire receiving guide groove, a retaining element associated with the groove and movable into inoperative position, wire twisting means, a lever operatively connected with the wire twisting means, and a cam actuated by the lever for moving the wire retaining means into inoperative position.

5. A tool of the character described including a jaw member provided with a wire receiving guide groove, means for feeding a length of wire through the groove, a wire retaining plate for the groove, an arm carrying the said plate, a plunger on the arm, twisting means, a lever operatively connected with the twisting means, and cam means on the lever adapted to engage the plunger to move the wire retaining plate away from the groove.

6. A tool of the character described including a jaw provided with a wire receiving guide groove adapted to loop a wire as it is fed through the same, wire retaining means for the groove, an operating lever, and means actuated by the operating lever for feeding a wire through the groove of the jaw, severing the wire, releasing the wire retaining means and twisting the ends of the severed length of wire.

7. A tool of the character described including a rotatable wire twisting device, wire cutting means associated therewith, a lever, gearing for rotating the twisting device, means at the outer end of the lever for actuating the gearing, and means at the inner end of the lever for engaging the twisting device to actuate the same during the wire cutting portion of its movement.

8. A tool of the character described including a twisting disc provided with a shoulder, wire cutting means associated with the disc, an operating element, means actuated thereby for rotating the disc, and means carried thereby for engaging the shoulder of the disc to apply power directly thereto during the wire cutting portion of its movement.

9. A tool of the character described including a wire twisting disc provided with a shoulder, wire cutting means associated with the disc, an operating element, gearing actuated by the operating element for rotating the twisting disc and subsequently returning the same to its original position, a member carried by the actuating element for engaging the shoulder of the disc to apply power directly thereto during the wire cutting portion of its movement, and means for preventing said member from being engaged by the shoulder of the disc during the return movement of the disc.

10. A tool of the character described including a rotatable twisting disc, wire cutting means associated with the disc, said disc being formed with a shoulder in the periphery thereof, an actuating element, gearing driven thereby for rotating the twisting disc, and then returning the same to its original position, a flexible arm carried by the actuating element and provided with a nose adapted to engage the shoulder of the disc to impart power directly thereto during the wire cutting portion of its movement, and means for flexing the arm to prevent the nose from engaging the shoulder during the return rotation of the disc.

11. A tool of the character described including a twisting disc provided with a recess and also with a wire guiding passage, means for feeding a length of wire through the said passage, means for automatically looping the wire as it is fed and causing the free end thereof to project into the recess of the disc, a twisting shaft and a finger carried by the twisting shaft and projecting into the recess of the disc, and means for rotating the shaft whereupon the finger is caused to grip the wire and then to rotate the disc to twist the ends of the wire.

12. A tool of the character described including a twisting disc provided with a recess and a wire guiding passage, means for feeding a length of wire through the passage, guide means for looping the wire as it is fed through the passage and causing the free end thereof to project into the recess of the disc, wire cutting means associated with the disc, a twisting shaft, a finger carried by the twisting shaft and projecting into the recess of the disc, and means for rotating the shaft whereupon the finger is caused to grip the wire and then forcibly rotate the disc to twist the ends of the wire together.

13. A tool of the character described including a twisting disc provided with a receiving recess and also with a wire guiding passage, means for feeding a length of wire through the passage, means for bending the wire as it is fed through the passage and directing the free end thereof into the recess of the disc, wire cutting means associated with the disc, a twisting shaft, a finger upon the twisting shaft projecting into the recess of the disc, means for initially moving the disc to cut the wire, and means for rotating the shaft whereby the finger is caused to grip the wire and then rotate the disc to twist the ends of the wire together.

14. A tool of the character described including a portable frame, a hooked jaw adapted to receive the articles to be secured together by the wire, said jaw being rigid with the frame and being provided with guide means for looping a length of wire as it is fed through the same, rotatable twisting means arranged opposite the free end of the hooked jaw and engaging the end of the wire, an operating lever mounted on the portable frame, a feed wheel actuated by the operating lever for feeding successive lengths of wire to the jaw and twisting head, and gearing actuated by a subsequent increment of movement of the lever for rotating the twisting device to twist the ends of the wire together.

15. A tool of the character described including a twisting disc provided with a wire receiving recess and a wire guiding passage, wire guiding means for feeding wire through the said passage of the disc, a feed wheel associated with the feed wire guiding means, a lever operatively connected with the feed wheel for feeding a length of wire through the said guide means and passage of the disc, means for automatically looping the wire as it is fed through the passage of the disc and causing the free end of the wire to project into the recess of the disc, and means actuated by the lever for rotating the disc to twist the ends of the wire together.

16. A tool of the character described including a twisting disc provided with a recessed portion and a wire guiding passage, wire guiding means leading to the said passage of the disc, a feed wheel associated with the wire guiding means, a pinion for driving the feed wheel, a pawl and ratchet connection between the pinion and feed wheel for preventing backward rotation of the feed wheel, a lever, a rack carried by the lever for engaging the pinion to feed the wire, means for automatically bending the wire as it is fed through the passage of the disc and causing the free end of the wire to project into the recessed portion of the disc, and means actuated by the lever for subsequently rotating the disc to twist the ends of the wire.

17. A tool of the character described including a twisting disc provided with a wire receiving recess and a wire guiding passage adapted to receive the opposite ends of the wire to be twisted, wire guiding means leading to the passage of the disc, a feed wheel associated with the wire guiding means, an operating lever, gearing driven by the operating lever for actuating the feed wheel to feed a length of wire through the passage of the twisting disc, means for automatically looping the wire as it is fed and causing the free end thereof to enter the recess of the disc, and gearing actuated by the lever for subsequently rotating the disc to twist the ends of the wire together.

18. A tool of the character described including a twisting disc provided with a wire receiving recess and a wire guiding passage, wire guiding means for directing wire to the said passage, feeding means associated with the said guiding means, a lever operatively connected with the feeding means for actuating the same to advance a wire through the passage of the disc, means engaging the wire as it is advanced to automatically loop the same and cause the free end thereof to project into the recess of the disc, a twisting shaft, a finger carried thereby and projecting into the recess of the disc, and gearing actuated by the lever for rotating the shaft whereby the finger first grips the end of the wire and then rotates the disc to twist the ends of the wire together.

19. A tool of the character described including a twisting disc provided with a recess and a wire guiding passage, wire guiding means leading to the said passage of the disc, feeding means associated with the guiding means, an operating lever, a pair of racks thereon, a toothed member engageable by one of the racks and operatively connected with the wire feeding means for advancing a length of wire through the passage of the disc, means for automatically looping the wire as it is fed through the passage of the disc and causing the free end thereof to enter the recess of the disc, a toothed member subsequently engageable by the other rack of the lever and gearing actuated thereby for rotating the disc to twist the ends of the wire together.

20. A tool of the character described including a twisting disc provided with a wire receiving recess and a wire guiding passage, wire guiding means for directing wire to the passage of the disc, a wire cutting die arranged in cooperative relation to the disc, feeding means associated with the guiding means, an operating lever, means actuated by the lever for driving the feeding means to feed a length of wire through the passage of the disc, means for automatically looping the wire as it is fed through the passage and causing the free end thereof to enter the recess of the disc, gearing actuated by the lever for rotating the disc to twist the ends of the wire together, and independent means for transmitting power from the lever to the disc during the wire cutting portion of the movement thereof.

21. A tool of the character described including a twisting disc provided with a jaw, a twisting shaft upon which the disc is mounted, and a finger carried by the shaft and adapted to cooperate with the jaw to first grip a wire and then rotate the disc.

22. A tool of the character described including a rotatable twisting disc, provided with a wire receiving recess and also with a wire guiding passage, means for feeding a length of wire through the passage, guide means for automatically bending the said wire as it is fed and causing the end thereof to enter the recess of the disc, a die member cooperating with an end of the wire guiding passage to automatically sever the wire when the disc is rotated to twist the wire, and means for rotating the disc to sever the wire and twist the ends thereof together.

23. A hand supported and operated tool of the character described, including a portable frame, a hooked jaw rigid therewith and adapted to be manipulated to receive the members to be fastened within the said hooked jaw, means on the frame for feeding wire longitudinally to the jaw, means for directing the wire around the jaw and around the members therein as it is fed forward, means for severing the wire, and means for twisting the ends of the severed length of wire.

24. A hand supported and operated tool of the character described, including a portable frame, a hooked jaw rigid therewith and having a free end spaced from the frame to provide an open mouth for the reception of the articles to be fastened together, means on the frame for feeding wire longitudinally, means for directing the wire around the hooked jaw and across the open mouth thereof as it is fed, means for severing the wire, and means for twisting the ends of the severed length of wire together.

25. A hand supported and operated tool of the character described, including a portable frame, a hooked jaw rigid therewith and having a free end which is spaced from the frame to provide a mouth through which the articles to be fastened together can enter the jaw, a hand lever mounted on the frame, wire feeding means actuated thereby, means for guiding the wire around the jaw and across the open mouth thereof, means actuated by the hand lever for severing the wire, and means also actuated by the hand lever for twisting the ends of the severed length of wire.

26. A hand supported and operated tool of the character described, including a twisting disc provided with a wire guiding passage, means for feeding a length of wire through the said passage, means for automatically looping the wire as it is fed and causing the free end thereof to be brought back to the disc, a twisting shaft on which the disc is mounted, and wire gripping means providing a driving connection between the twisting shaft and the twisting disc and adapted to engage the free end of the wire whereby the wire is first gripped and the disc then rotated to twist the ends of the wire.

27. A hand supported and operated tool of the character described, including a portable frame, a hooked jaw rigid with the frame and having the free end thereof spaced therefrom to provide an open mouth through which the articles to be fastened can enter the jaw, a twisting disc mounted upon the frame at one side of the open mouth of the hooked jaw, said twisting disc being provided with a recess and a wire guiding passage, means on the frame for feeding a length of wire through the passage, guide means for directing the wire around the hooked jaw and across the open mouth thereof into the recess of the twisting disc as the wire is advanced, and means on the frame for rotating the twisting disc to twist the ends of the wire.

28. A tool of the character described, including a twisting disc provided with a wire guiding passage, means for feeding wire through the passage and looping the end thereof, means on the disc for engaging the free end of the wire, and a die plate arranged adjacent the twisting disc whereby rotation of the disc performs the double function of severing the wire and twisting the ends thereof.

29. A tool of the character described, including a frame readily portable and manipulatable by hand, a hooked jaw member rigid therewith and adapted to be placed about the articles to be fastened together, said jaw having a groove adapted to receive and guide the wire about the jaw so as to surround the articles to be secured together, means for feeding a length of wire through the groove, means for severing the wire, and means for twisting the ends of the wire, all of said members and means being mounted upon said frame so as to constitute a unitary, hand-supported and hand-operated tool.

30. A tool of the character described including a wire-cutting means, a wire-twisting means, an operating lever, means operated by said lever for actuating the cutting means, and independent means for actuating the twisting means from the said lever as a continuation of the same manipulation which effects the wire-cutting operation.

31. A tool of the character described including a wire-cutting means, a wire-twisting means, an operating lever, means operated by the said lever for actuating the cutting means, gearing operated by said lever for actuating the twisting means, the said operation of the gearing being effected by a continuation of the same manipulation which effects the cutting operation, and a direct connection, independent of the said gearing, for operating the said cutting means.

32. A tool of the character described including a rotatable means, wire-cutting means and wire-twisting means operated by said rotatable means, an operating lever, gearing driven by the operating lever for rotating the twisting means, and means mounted upon the lever and independent of the said gearing for a direct engagement with the rotatable means to impart power directly thereto for effecting the wire-cutting operation.

In testimony whereof I affix my signature.

ROY S. THOMPSON.